3,144,458
MONO AND BIS N-(p-SULFAMOYLBENZYL) QUATERNARY AMMONIUM SALTS OF TRIETHYLENEDIAMINE
Robert B. Moffett, Kalamazoo, Mich., assignor to The Upjohn Company, Kalamazoo, Mich., a corporation of Delaware
No Drawing. Filed Dec. 20, 1963, Ser. No. 332,275
4 Claims. (Cl. 260—268)

This invention relates to mono and bis quaternary ammonium salts of triethylenediamine and to processes for their preparation and is more particularly concerned with the mono and bis N-(p-sulfamoylbenzyl) quaternary ammonium salts of triethylenediamine and with processes for their preparation.

The compounds of the invention can be represented by the following formulae:

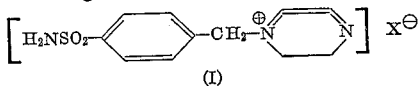

(I)

and

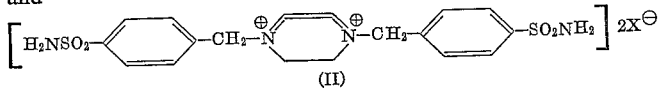

(II)

wherein X is the anion of a pharmacologically acceptable acid. The compounds of the invention also include the acid addition salts of the free bases of Formula I with pharmacologically acceptable acids, and the N-oxides of the compounds of Formula I and the acid addition salts of said N-oxides with pharmacologically acceptable acids.

The term "pharmacologically acceptable acids" is well recognized in the art and is inclusive of acids such as sulfuric, hydrochloric, hydrobromic, hydriodic, nitric, phosphoric, lactic, benzoic, methanesulfonic, p-toluenesulfonic, salicylic, acetic, propionic, maleic, malic, tartaric, citric, cyclohexylsulfamic, succinic, nicotinic, ascorbic acids and the like.

The novel compounds of the invention, i.e., the compounds of Formulae I and II above, the N-oxides of compounds of Formula I, and the acid addition salts of the compounds of Formula I and of the N-oxides thereof with pharmacologically acceptable acids, possess pharmacological activity. Illustratively the compounds of the invention show antibacterial activity, ganglionic blocking activity, and central nervous system depressant activity. The antibacterial activity of the compounds of the invention renders them valuable for the control of bacterial organisms, both systemically and topically in mammals, and also for sterilization purposes, for example in the sterilization of surgical instruments and in related fields.

For purposes of administration to mammals, including animals of economic value, the novel compounds of the invention can be combined with solid and liquid pharmaceutical carriers and formulated in the form of tablets, powder packets, capsules and like solid dosage forms using starch and like excipients, or dissolved or suspended in suitable solvents or vehicles for oral or parenteral administration.

The novel compounds of the invention can be prepared conveniently by reacting triethylenediamine with the appropriate p-sulfamoylbenzyl halide

wherein Hal represents a halogen atom, preferably bromine or chlorine. The reaction is carried out advantageously in the presence of an inert solvent, for example, an alkanone such as acetone, methyl ethyl ketone, methyl isopropyl ketone and the like, or an alkanol such as methanol, ethanol, butyl alcohol and the like. Where the required product is the mono quaternary ammonium salt of Formula I the triethylenediamine and the halide can be employed in approximately stoichiometric quantities, i.e., equimolar quantities. It is preferred, however, to employ the triethylenediamine in excess. Where the required product is the bis quaternary ammonium salt of Formula II the quantities of reactants can be approximately stoichiometric, i.e., about 2 moles of the halide per mole of triethylenediamine. It is preferred, however, to employ the halide in excess.

The reaction is generally conducted at a temperature of the order of 20 to 30° C., although higher or lower temperatures can be employed if desired. Generally speaking the required product separates from solution and is isolated by filtration. If desired the compound so obtained can be purified by conventional procedures, for example by recrystallization.

The anion of the quaternary ammonium salts obtained as described above can be exchanged for any other desired anion, for example, the anions of other pharmacologically acceptable acids, by conventional procedures. For example, any of the quaternary ammonium salts of the invention can be converted to the corresponding quaternary ammonium hydroxide, illustratively by treatment with silver oxide, and the hydroxide so obtained is reacted with the appropriate acid to obtain the desired quaternary ammonium salt.

The acid addition salts of the compounds of Formula I above can be prepared by reacting the compound of Formula I with a pharmacologically acceptable acid in the presence of an inert solvent such as water, ether, and lower alkanols such as methanol, ethanol and the like.

The N-oxide compounds of the invention can be prepared by methods well known in the art, for example, by reacting the free base of the Formula I with an oxidizing agent such as hydrogen peroxide, peracetic acid, Caro's acid, and the like. Advantageously, the reaction is carried out at ordinary temperatures (e.g., of the order of 20 to 30° C.) in the presence of an inert solvent such as benzene, chloroform, lower-alkyl alkanoates such as ethyl acetate, and lower alkanols such as methanol, ethanol, isopropyl alcohol, and the like. Suitably the oxidizing agent is employed in at least stoichiometric proportions with respect to the free base (I) and preferably the oxidizing agent is present in a slight excess. When the reaction has been completed, any excess of oxidizing agent can be removed by treating the reaction mixture with an agent such as platinum, palladium, Raney nickel, and inorganic hydrosulfites, such as sodium hydrosulfite, and the like.

The N-oxides of the invention can also be prepared by reacting the mono N-oxide of triethylenediamine with an approximately equimolar proportion of the appropriate p-sulfamoylbenzyl halide using the conditions described above for the preparation of the quaternary ammonium salts of the invention.

The N-oxide acid addition salts of the invention can be prepared from the corresponding N-oxide and a pharmacologically acceptable acid using the procedures hereinbefore described for the preparation of the acid addition salts of the compounds (I).

For the sake of simplicity, the well-known trivial name triethylenediamine is employed herein. For indexing purposes Chemical Abstracts employs the systematic name 1,4-diazabicyclo [2.2.2]octane for this diamine. The system of nomenclature used in naming the novel quaternary ammonium salts of this invention is consistent with Chemical Abstracts practice.

The following examples illustrate the best method contemplated by the inventor for carrying out his invention.

EXAMPLE 1

*1-(p-Sulfamoylbenzyl)-4-Aza-1-Azoniabicyclo[2.2.2] Octane Bromide*

To a warm solution of 33.6 g. (0.3 mole) of triethylenediamine in 300 ml. of methyl ethyl ketone was added slowly with vigorous stirring a hot solution of 20.3 g. (0.08 mole) of p-sulfamoylbenzyl bromide in 300 ml. of methyl ethyl ketone. The resulting mixture was stirred for 1.5 hr. and then allowed to stand overnight at approximately 25° C. The solid which had separated was isolated by filtration and dried. There was thus obtained 29.4 g. of 1-(p-sulfamoylbenzyl)-4-aza-1-azoniabicyclo-[2.2.2]octane bromide in the form of a crystalline solid having a melting point of 235 to 240° C. (decomposition; darkening from 190° C.). Recrystallization from 95% methanol raised the melting point to 241° C. (decomposition) and a second recrystallization from 80% methanol gave material having a melting point of 240 to 245° C. (decomposition).

*Analysis.*—Calcd. for $C_{13}H_{20}BrN_3O_2S$: C, 43.10; H, 5.56; N, 11.59; Br, 22.06. Found: C, 42.96; H, 5.70; N, 11.27; Br, 21.47.

EXAMPLE 2

*1-(p-Sulfamoylbenzyl)4-Aza-1-Azoniabicyclo[2.2.2] Octane Bromide Hydrobromide*

The above compound can be obtained as follows: A solution of 1 g. of 1-(p-sulfamoylbenzyl)-4-aza-1-azoniabicyclo[2.2.2]octane bromide in 50 ml. of absolute methanol is acidified by the addition of methanolic hydrogen bromide. The resulting solution is cooled and the solid which separates is isolated by filtration and dried in vacuo. There can thus be obtained 1-(p-sulfamoylbenzyl)-4-aza-1-azoniabycyclo[2.2.2]octane bromide hydrobromide.

EXAMPLE 3

*1,4-Bis(p-Sulfamoylbenzyl)-1,4-Diazoniabicyclo[2.2.2] Octane Dibromide*

To a solution of 11.2 g. (0.1 mole) of triethylenediamine in 100 ml. of methanol was added slowly with stirring a warm solution of 75.0 g .(0.3 mole) of p-sulfamoylbenzyl bromide in 700 ml. of methyl ethyl ketone. The resulting mixture was stirred at 50 to 55° C. for 16 hr. before being cooled. The solid which separated was isolated by filtrtaion, washed with methanol, and dried. There was thus obtained 55.8 g. of 1,4-bis(p-sulfamoylbenzyl)-1,4-diazoniabicyclo[2.2.2]octane dibromide in the form of a crystalline solid having a melting point of about 269° C. (decomposition). This material was recrystallized from 350 ml. of water to give 52.9 g. of crystalline material having a melting point of about 266° C. (decomposition).

*Analysis.*—Calcd. for $C_{20}H_{28}Br_2N_4O_4S_2$: C, 39.22; H, 4.61; N, 9.15; Br, 26.10. Found: C, 39.50; H, 4.52; N, 8.77; Br, 25.87.

EXAMPLE 4

*1,4-(p-Sulfamoylbenzyl)-1,4-Diazoniabicyclo[2.2.2] Octane Dichloride*

The above compound can be obtained as follows: A solution of 1,4-bis(p-sulfamoylbenzyl)-1,4-diazoniabicyclo[2.2.2]octane dibromide in water is shaken with a suspension of silver oxide until the precipitation of silver bromide is complete. The resulting mixture is filtered and the filtrate containing the corresponding quaternary ammonium hydroxide is neutralized by the addition of aqueous hydrochloric acid. By evaporating the resulting mixture to dryness, 1,4-bis(p-sulfamoylbenzyl)-1,4-diazoniabicyclo[2.2.2]octane dichloride can be obtained.

Similarly, using the above procedure, but replacing hydrochloric acid by other acids such as hydriodic, sulfuric, phosphoric, acetic, methanesulfonic and like acids, there can be obtained the corresponding quaternary ammonium salts.

Similarly, 1-(p-sulfamoylbenzyl)-4-aza - 1 - azoniabicyclo[2.2.2]octane bromide can be converted to the corresponding quaternary ammonium salts with other acids such as those enumerated above, and, by using an excess of acid in the neutralization, to the corresponding acid addition salts.

EXAMPLE 5

*1-(p-Sulfamoylbenzyl)-4-Aza-1-Azoniabicyclo[2.2.2] Octane N-Oxide Bromide*

The above compound can be prepared as follows: To a solution of 1 g. of 1-(p-sulfamoylbenzyl)-4-aza-1-azoniabicyclo[2.2.2]octane bromide in 50 ml. of absolute ethanol is added an equimolar quantity of 30% hydrogen peroxide. The mixture is allowed to stand for 4 days at room temperature, at the end of which time the mixture is shaken with 0.5 g. of finely divided platinum until a test for peroxide is negative. The mixture is then filtered and the filtrate is evaporated to dryness under reduced pressure. There can thus be obtained 1-(p-sulfamoylbenzyl)-4-aza-1-azoniabicyclo[2.2.2]octane N-oxide bromide.

The N-oxide bromide so obtained can be converted to its hydrobromide by using the procedure described in Example 2.

Similarly, other 1-(p-sulfamoylbenzyl)-4-aza-1-azoniabicyclo[2.2.2]octane quaternary ammonium salts can be converted to the corresponding N-oxides using the above procedure and these N-oxides can be converted to the corresponding acid addition salts.

EXAMPLE 6

*1-(p-Sulfamoylbenzyl)-4-Aza-1-Azoniabicyclo[2.2.2] Octane N-oxide Bromide*

The above compound can be prepared as follows: To a solution of 22.4 g. (0.2 mole) of triethylenediamine in 400 ml. of absolute ethanol is added, during 15 minutes with stirring at 20° C., 100 ml. of 30% aqueous hydrogen peroxide. After standing at room temperature for 4 days the excess hydrogen peroxide is destroyed by cautiously adding an aqueous slurry of 0.5 g. of 30% platinum on charcoal. After stirring vigorously for 4 hr. the mixture is filtered through a filter aid and the filtrate is cooled to 3° C. To the cooled solution is added a solution of 53.3 g. (0.21 mole) of p-sulfamoylbenzyl bromide in methanol. The mixture is allowed to stand overnight and is then filtered and the filtrate is diluted with ether. The solid which separates is isolated by filtration and dried. There can thus be obtained 1-(p-sulfamoylbenzyl)-4-aza-1-azoniabicyclo[2.2.2]octane N-oxide bromide.

I claim:

1. A compound selected from the class consisting of (a) mono and bis quaternary ammonium salts of triethylenediamine having the formulae:

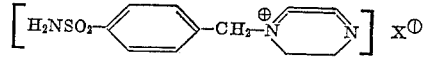

and

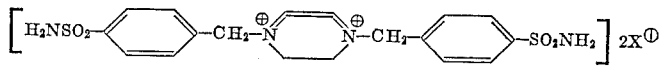

wherein X is the anion of a pharmacologically acceptable acid, and (b) the acid addition salts of the above mono quaternary ammonium salts with pharmacollogically acceptable acids.

2. 1-(p-sulfamoylbenzyl)-4-aza-1-azoniabicyclo[2.2.2]octane bromide.

3. 1,4-bis(p-sulfamoylbenzyl)-1,4-diazoniabicyclo[2.2.2]octane dibromide.

4. A compound selected from the class consisting of (a) N-oxides having the formula:

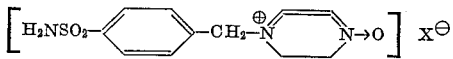

wherein X is the anion of a pharmacologically acceptable acid, and (b) the acid addition salts thereof with pharmacologically acceptable acids.

No references cited.

UNITED STATES PATENT OFFICE
CERTIFICATE OF CORRECTION

Patent No. 3,144,458                          August 11, 1964

Robert B. Moffett

It is hereby certified that error appears in the above numbered patent requiring correction and that the said Letters Patent should read as corrected below.

Column 3, line 28, for "Br, 21.47" read -- Br, 21.57 --; line 30, for "1-(p-Sulfamoylbenzyl)4", in italics, read -- 1-(p-Sulfamoylbenzyl)-4 --, in italics; line 40, for "azoniabycyclo" read -- azoniabicyclo --; column 4, lines 68 to 70, for the extreme right-hand portion of the formula reading:

$$X^{\oplus} \quad\quad \text{read} \quad\quad X^{\ominus}$$

same column 4, lines 73 to 75, for the extreme right-hand portion of the formula reading:

$$2X^{\oplus} \quad\quad \text{read} \quad\quad 2X^{\ominus}$$

column 5, line 7, for "1,4-bis(psulfamoylbenzyl)" read -- 1,4-bis(p-sulfamoylbenzyl) --.

Signed and sealed this 22nd day of December 1964.

(SEAL)
Attest:

ERNEST W. SWIDER                          EDWARD J. BRENNER
Attesting Officer                       Commissioner of Patents